May 15, 1956 — O. E. KLAWITTER — 2,745,445
PORTABLE PATTERN MAKER'S FACER
Filed July 21, 1953 — 2 Sheets-Sheet 1
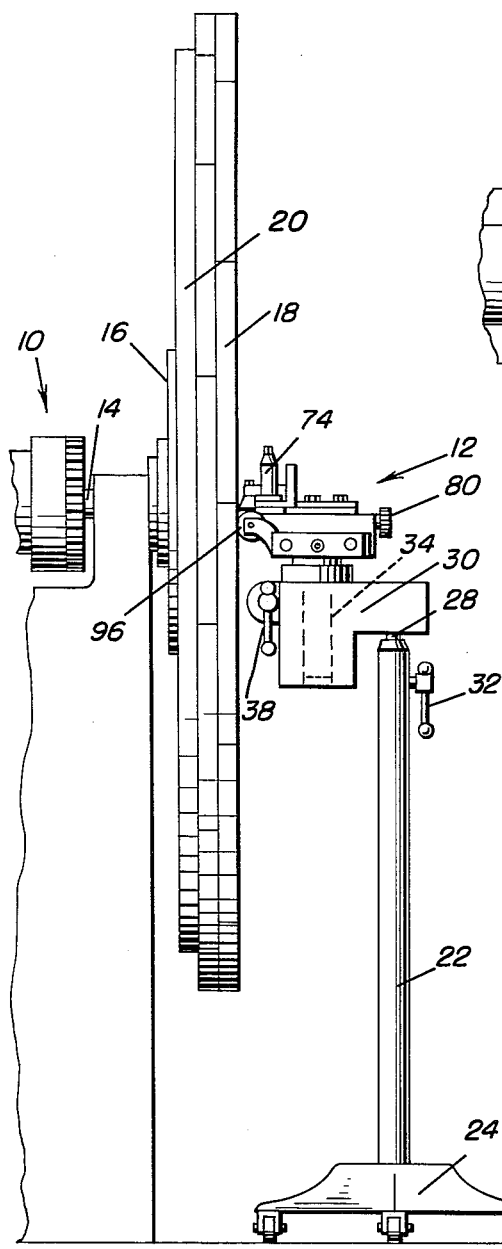
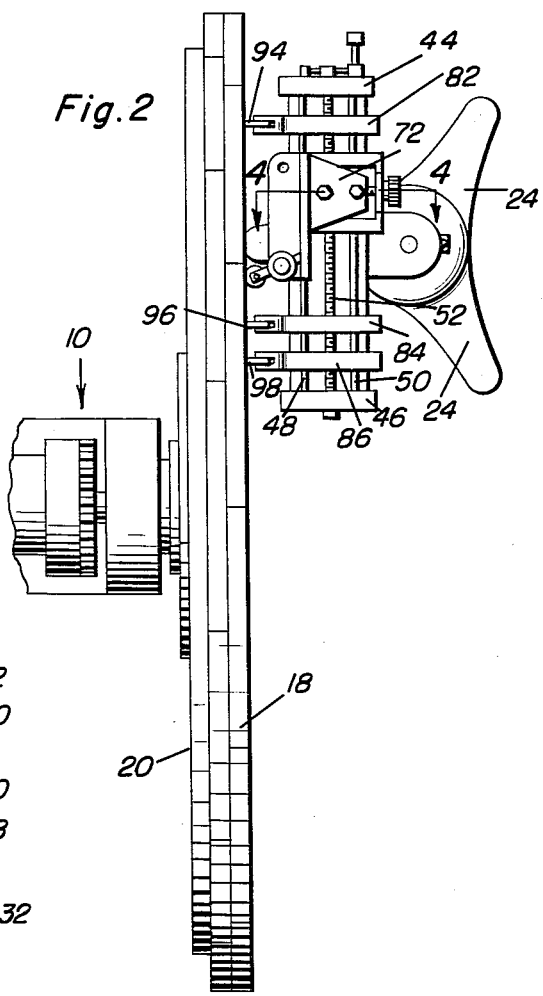
Oscar E. Klawitter
INVENTOR.

May 15, 1956   O. E. KLAWITTER   2,745,445
PORTABLE PATTERN MAKER'S FACER
Filed July 21, 1953   2 Sheets-Sheet 2
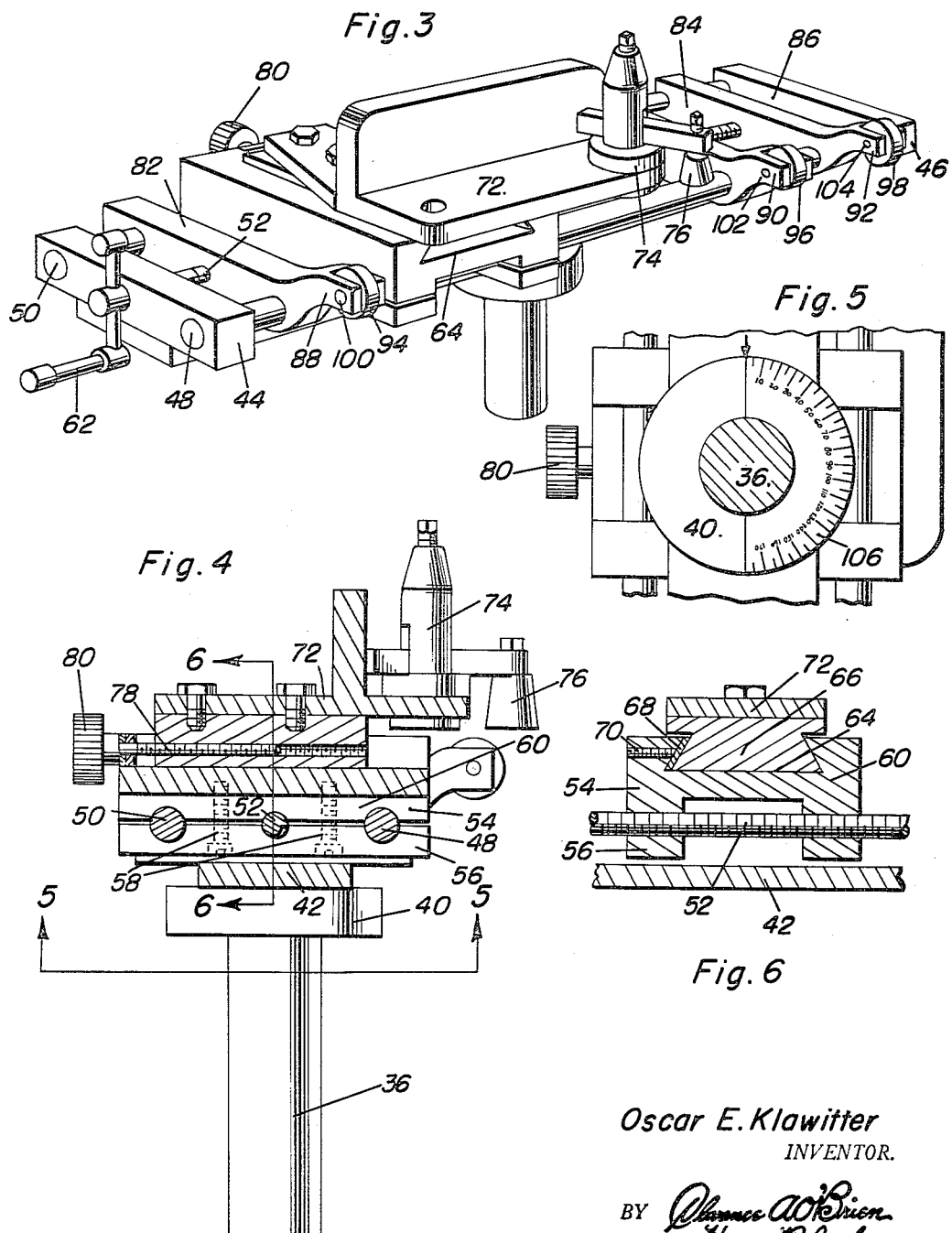
Oscar E. Klawitter
INVENTOR.

United States Patent Office 2,745,445
Patented May 15, 1956

2,745,445

PORTABLE PATTERN MAKER'S FACER

Oscar E. Klawitter, Millville, N. J.

Application July 21, 1953, Serial No. 369,300

5 Claims. (Cl. 142—1)

This invention relates to the class of machine tools and more particularly to an apparatus adapted to enable the outer surfaces of comparatively large sized patterns to be properly faced.

The construction of this invention features means for mounting a cutting tool on a portable and movable support whereby the cutting tool may travel along a distance equivalent to the radius of the pattern being faced, the tool including guide wheels or discs adapted to engage the surface of the pattern to be faced so as to enable the tool to be properly adjusted for more efficient cutting action.

Another important object of this invention resides in the provision of means for moving the cutting tool inwardly toward the work piece or back therefrom so as to enable the precise amount of cut to be predetermined and pre-set.

Still further objects and features of this invention reside in the provision of a portable pattern maker's facer which reduces the amount of time necessary in finishing the surfaces of patterns, which enables the patterns to be surfaced with great accuracy, which is strong and durable, and which is exceedingly compact while being very versatile.

These together with the various ancillary objects and features of the invention which will become apparent as the following description proceeds, are obtained by this portable pattern maker's facer, a preferred embodiment of which has been illustrated in the accompanying drawings, by way of example only, wherein:

Figure 1 is a side elevational view showing the portable pattern maker's facer as utilized in surfacing a pattern formed from a composite assembly of various pieces of wood or like material;

Figure 2 is a top plan view of the structure shown in Figure 1;

Figure 3 is a perspective view illustrating the construction of the component parts of the invention in greatest detail;

Figure 4 is an enlarged vertical sectional view as taken along the plane of line 4—4 in Figure 2;

Figure 5 is a horizontal sectional view as taken along the plane of line 5—5 in Figure 4; and Figure 6 is a vertical sectional view as taken along the plane of 6—6 in Figure 4 illustrating the construction of the carriage and slide carried thereby.

With continuing reference to the accompanying drawings wherein like reference numerals designate similar parts throughout the various views, reference numeral 10 generally designates a lathe in conjunction with which the portable pattern maker's facer 12 comprises the present invention is adapted to be used. The lathe 10 is conventional and includes a drive shaft 14 provided with a face plate 16 upon which a work piece 18 is suitably mounted. The work piece 18 is detachably secured to a base 20 and constitutes suitable pieces or strips of wood or like material which are glued or otherwise secured together in any desired relationship. In order to face the outer surface of the work piece 18 a cutting tool is provided, as is conventional. However, cutting tools heretofore used were generally bulky, cumbersome, and incapable of being easily adjusted so as to assure maximum efficacy in the surfacing of the work piece 18.

The portable pattern maker's facer comprising the present invention as indicated at 12 includes a vertical standard 22 formed from a tubular structure which is mounted in a base 24 having casters or wheels 26 provided therefor. The upper end of the tubular standard 22 is adapted to receive a shaft 28 attached to a tool bed support 30. Threaded clamping means 32 of conventional design are adapted to clampingly hold the shaft 26 relative to the standard 22. The tool bed support 30 is provided with an internal recess 34 for reception of a depending cylindrical end 36 of a tool bed. Clamping means 38 are provided for adjustably locking the cylindrical member 36 within the tool bed support 30. The cylindrical member 36 is provided with a headed portion 40 which has an elongated bar 42 attached thereto to which bar there are welded or otherwise secured end pieces 44 and 46. Extending through the end pieces 44 and 46 are guide rods 48 and 50 which are preferably cylindrical in shape. Also journaled in the end pieces 44 and 46 is a threaded carriage bar 52. A tool carriage 54 is positioned over the rods 48 and 50 and the carriage bar 52 and lockingly held in position by means of clamping plates 56 which are lockingly secured beneath the guide rods 48 and 50 and the carriage 54 by means of bolts 58.

The carriage 54 includes a lower member 60 which is provided with a threaded portion adapted to co-act with the carriage bar 52 so that upon rotation of the carriage bar 52 by means of handle 62 the carriage can traverse from one side of the tool bed to the other. The lower member 60 is provided with a dovetail slot 64 therein for reception of a slide 66 provided with a dovetail-shaped lower portion of less size than the dovetail slot 64. A plate or strip 68 is received between the walls of the lower member 60 defining the slot 64 and the slide 66 and is lockingly held in place by a set screw 70 to hold the slide 66 in adjusted position relative to the lower member 60. Bolted to the slide 66 is a tool support plate 72 which carries a tool holder 74 of conventional design for reception of a suitable conventional cutting tool 76 or any other suitable tool used in finishing the outer surface of the pattern or work piece 18. A threaded adjusting rod 78 operated by handle 80 is provided for moving the slide 66 and hence the tool 76 inwardly toward the work piece 18 or away therefrom.

Three important elements of the invention are the guide blocks 82, 84 and 86 which are slidably mounted on the guide rods 48 and 50 and which have bifurcated end portions 88, 90, and 92 or reception of guide wheels or discs 94, 96 and 98 mounted on shafts 100, 102 and 104. The discs or wheels 94, 96 and 98 are adapted to abut against the work piece 18.

It is to be noted that a scale or protractor 106 may be provided on the lower portion or surface of the head 40 of the tubular members 36 whereby the tool bed may be adjusted relative to the tool bed support or cutting at an angle desired.

In operation, after the pattern has been placed on the face plate 16 of the lathe the portable machine is positioned in the tool bed support 30. The guide wheels 96, 98 and 100 are positioned immediately adjacent the rough pattern or work piece and the entire machine is squared relative to the pattern. Then the pattern may be started revolving and using the knurled handle 80, the cutting tool 76 may be positioned in contact with the wood of the work piece. After turning the handle 62 to cause the work piece to be cut for a suitable distance the lathe may be stopped and the portable pattern maker's facer 12 may be re-set so that the guide wheels or discs 94, 96 and 98 contact the finished portion of the work piece. The lathe may be again started and the whole length of the machine can be traversed by the carriage 54 to thereby finish the work piece. If it is necessary to take in a larger area than that provided by the width of the bed of the machine, it is only necessary to slide the base 24 along with the guide wheels 94, 96 and 98 against the finished work. The guide wheels 94, 96 and 98 will keep the entire assembly on a straight path at all times.

Since from the foregoing the construction and advantages of this portable pattern maker's facer are readily apparent, further description is believed to be unnecessary.

However, since numerous qualifications will readily occur to those skilled in the art after a consideration of the foregoing specification and accompanying drawing, it is not intended to limit the invention to the precise embodiment shown and described, but all suitable modifications and equivalents may be readily resorted to.

I claim:

1. In a portable pattern maker's facer having a tool bed provided with a support including a base plate having spaced upwardly extending end pieces and guide rods extending between said end pieces, the combination of a threaded carriage bar journaled in said end pieces, a tool carriage clampingly secured about said guide rods and threadedly engaging said carriage bar and work piece engaging guide blocks slidably positioned on said guide rods, said guide blocks having bifurcated end portions, discs rotatably mounted on shafts extending between the bifurcated end portions of said guide blocks, said discs extending outwardly from said guide blocks and being adapted to engage the work piece.

2. A portable pattern maker's facer comprising a vertical standard, a tool bed support carried by said standard, a tool bed adjustably secured to said support, said tool bed including a base plate having spaced upwardly extending end pieces, guide rods extending between said end pieces, a threaded carriage bar journaled in said end pieces, a tool carriage clampingly secured about said guide rods and threadedly engaging said carriage bar, and work piece engaging guide blocks slidably positioned on said guide rods.

3. A portable pattern maker's facer comprising a vertical standard, a tool bed support carried by said standard, a tool bed adjustably secured to said support, said tool bed including a base plate having spaced upwardly extending end pieces, guide rods extending between said end pieces, a threaded carriage bar journaled in said end pieces, a tool carriage clampingly secured about said guide rods and threadedly engaging said carriage bar, and work piece engaging guide blocks slidably positioned on said guide rods, said guide blocks having bifurcated end portions, discs rotatably mounted on shafts extending between the bifurcated end portions of said guide blocks, said discs extending outwardly from said guide blocks and being adapted to engage the work piece.

4. A portable pattern maker's facer comprising a vertical standard, a tool bed support carried by said standard, a tool bed adjustably secured to said support, said tool bed including a base plate having spaced upwardly extending end pieces, guide rods extending between said end pieces, a threaded carriage bar journaled in said end pieces, a tool carriage clampingly secured about said guide rods and threadedly engaging said carriage bar, and work piece engaging guide blocks slidably positioned on said guide rods, said carriage including a lower member provided with a dovetail slot therein, a slide adjustably positioned in said slot, means for adjusting said slide, and a tool holder carried by said slide.

5. A portable pattern maker's facer comprising a vertical standard, a tool bed support carried by said standard, a tool bed adjustably secured to said support, said tool bed including a base plate having spaced upwardly extending end pieces, guide rods extending between said end piece, a threaded carriage bar journaled in said end pieces, a tool carriage clampingly secured about said guide rods and threadedly engaging said carriage bar, and work piece engaging guide blocks slidably positioned on said guide rods, said carriage including a lower member provided with a dovetail slot therein, a slide adjustably positioned in said slot, means for adjusting said slide, and a tool holder carried by said slide, said guide blocks having bifurcated end portions, discs rotatably mounted on shafts extending between the bifurcated end portions of said guide blocks, said discs extending outwardly from said guide blocks and being adapted to engage the work piece, said standard being mounted in a base member, said base member having ground engaging wheels rotatably mounted thereon.

References Cited in the file of this patent

UNITED STATES PATENTS

| Number | Name | Date |
| --- | --- | --- |
| 988,630 | Diederich | Apr. 4, 1911 |
| 1,045,370 | Calahan | Nov. 26, 1912 |
| 1,060,173 | Edwards | Apr. 29, 1913 |
| 1,231,625 | Lee | July 3, 1917 |
| 1,564,349 | Hires | Dec. 8, 1925 |
| 1,611,305 | Ellwood | Dec. 21, 1926 |
| 1,616,895 | Grabowski | Feb. 8, 1927 |
| 1,876,992 | Mac Leod | Sept. 13, 1932 |